Nov. 5, 1957  C. W. FIGLIO ET AL  2,812,491
ELECTRICAL TESTER FOR NON-METALLIC LININGS
Original Filed March 8, 1951  2 Sheets-Sheet 1

INVENTORS
CHARLES W. FIGLIO,
JOHN S. MAGIELNICKI,
BY Robert W. Kell
ATTORNEY

Nov. 5, 1957 C. W. FIGLIO ET AL 2,812,491
ELECTRICAL TESTER FOR NON-METALLIC LININGS
Original Filed March 8, 1951 2 Sheets-Sheet 2
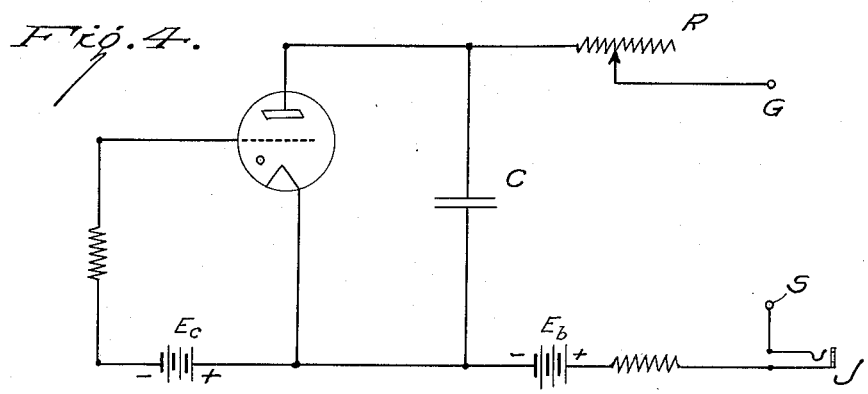
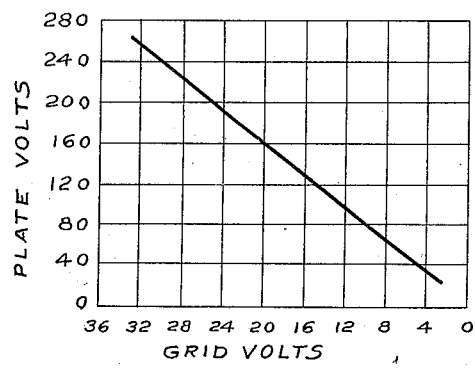
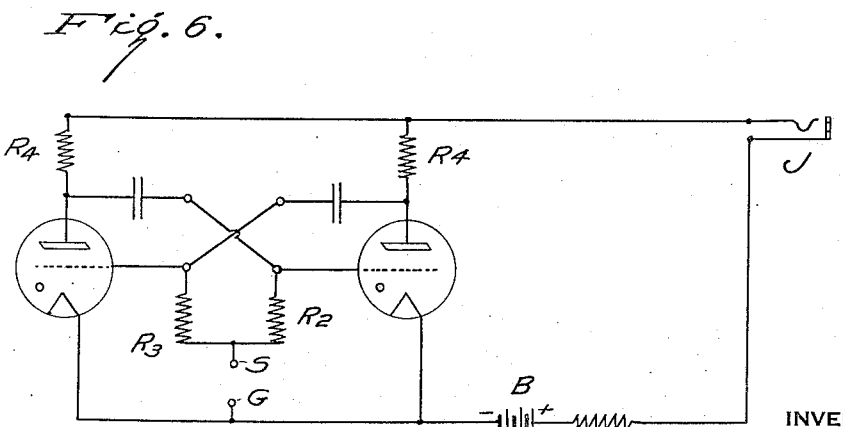
INVENTORS
CHARLES W. FIGLIO,
JOHN S. MAGIELNICKI,
BY Robert S. Kell
ATTORNEY

United States Patent Office 2,812,491
Patented Nov. 5, 1957

2,812,491

ELECTRICAL TESTER FOR NON-METALLIC LININGS

Charles W. Figlio, South Plainfield, and John S. Magielnicki, South River, N. J., assignors to American Cyanamid Company, New York, N. Y., a corporation of Maine Continuation of application Serial No. 214,585, March 8, 1951. This application January 11, 1957, Serial No. 633,761

3 Claims. (Cl. 324—54)

This invention is directed to a rapid method of detecting breaks in non-metallic coatings, by means of an apparatus herein described. More specifically, this invention consists of a method for measuring the electrical resistance of a non-conducting protective coating with such accuracy that a break in the coating may be detected at a considerable distance from that break. This application is a continuation of our copending application, Serial No. 214,585, filed March 8, 1951, now abandoned.

In the chemical industry where the handling of corrosive liquids has always been a problem, it has long been the custom to coat vessels that are to be used in chemical processes with linings that are impervious to corrosive liquids. The coating materials may vary widely, depending upon the use to which they will be subjected, one of the most resistant coating materials being glass. Larger vessels for use in the field, having a capacity up to 100,000 gallons, are coated with elastomers, synthetic resins or enamels.

The life of such chemical equipment is limited by the resistance of the protective coating applied, and it is not uncommon for these coatings to develop small cracks or breaks after extended use. If these breaks are discovered shortly after they occur, it is usually possible to repair the coating at that point, whereby an impervious film may be maintained indefinitely by periodic inspection and minor repairs. If periodic inspections are not made, the container may become so corroded that the entire piece of equipment must be replaced.

One of the earliest methods of detecting small breaks in a non-conducting protective coating was reported by Walker and Hickson of the National Bureau of Standards about 1929. Their method employed a galvanometer connection in series with a low-voltage battery, a resistor and an electrode. One pole of the battery was grounded to the metallic vessel and the electrode (which consisted of a wick saturated with a conducting electrolyte) was passed over the surface to be tested. The disadvantage of this testing procedure was that the electrode had to make a direct contact with the opening in the protective coating to obtain a reading on the galvanometer. It became a very tedious operation to cover the entire surface of a large vessel with the probe of this instrument, and unless direct contact was made at the exact point of the break, it was very easy to overlook the opening until irreparable damage had occurred.

A modification of the Walker method which retained all the disadvantages of that method, was the so-called phenolphthalein method which utilized a sodium chloride solution containing a few drops of phenolphthalein as the indicator in place of a galvanometer. When the circuit was closed at a break in the coating, electrolysis of the sodium chloride produced caustic soda and gave a red coloration to the electrolyte. In large tanks, testing became a two-man operation, one man maneuvering the electrode within the dark tank, the second man observing the electrolyte outside of the tank. In order to obtain more rapid reading by the phenolphthalein method, the operator was encouraged to increase the battery voltage which, if combustible vapors were present, introduced the additional hazard of an explosion.

A third method of testing chemical vessels is the so-called dielectric method which has found a great deal of favor in the testing of glass-lined equipment. A difference in potential is applied between the surface of the coating to be tested and the conducting vessel, with the result that a spark discharge immediately appears at any break. Although the dielectric method may be used conveniently in the testing of new equipment before it leaves the factory, it does not lend itself to use in the field because of its power requirements, nor may it be used in the vicinity of explosive mixtures. A further disadvantage of the dielectric method is apparent where the coating tested has a low break-down potential. In many cases, the voltage applied is sufficiently high to break down and destroy a thin coating where no actual break is present.

In our new method of testing for breaks, we employ an oscillator, the frequency of which is preferably within the audible range and controlled by an RC circuit. Associated with our oscillator is an audio detector and means for placing the resistance of the coating to be tested in series or parallel with the RC circuit.

It is well known that when a condenser and a resistor are connected in series with a source of E. M. F., the initial flow of current into the condenser is limited by the resistance, so that a longer period of time is required to charge the condenser than otherwise would be the case without the resistor. The time required is proportional to the capacity and resistance, the product of which is called the time constant of the circuit. Thus, any change in the resistance of a coating (such as would be caused by a break) will vary the time constant of the resistance capacity combination which determines the frequency of the oscillator. It is this change in frequency which we utilize in our method of testing to locate defects.

The apparatus of the present invention may be used to test any non-conductor lining applied to conducting surfaces. It may, for instance, even be used to test a rubber-lined wooden tub by the simple expedient of introducing a conductor such as water, between the surface of the tub and the lining. Our apparatus has the advantage that it will not "break down" or harm in any way a lining that is sound.

The chief advantage of this instrument, however, is that for the first time one is able to detect a break in the lining at a distance of 1 to 2 feet and determine the exact location very quickly. This speeds up the testing procedure because it is no longer necessary to test every point on the surface of the coating. This instrument is particularly valuable in detecting any break in a coating on an irregular surface. Whizzer baskets, for example, have an irregular surface generally sprayed with a rubber composition and vulcanized. They may be quickly tested by the method of this invention, whereas it was very tedious to locate the defect by earlier methods.

Fig. 4 illustrates a circuit employing a thyratron tube.

Fig. 5 illustrates the relation between grid voltage and plate voltage of the thyratron tube.

Fig. 6 illustrates a multivibrator which may be used as the oscillator.

Figure 1:
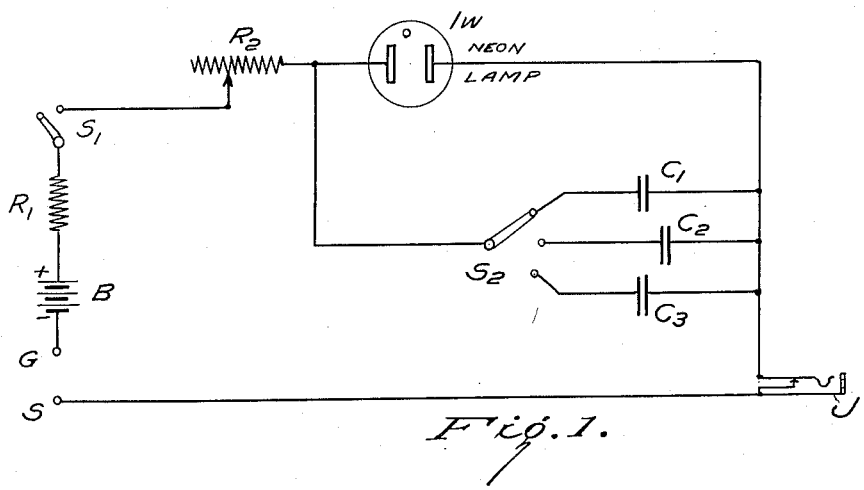
Fig. 1 shows a preferred embodiment of our apparatus employing a glow tube type of oscillator.

In our preferred embodiment of this invention, we use a glow tube in the manner illustrated by the wiring diagram of Fig. 1. In this diagram, battery B consists of two 45-volt "B" batteries connected in series for a total output of 90 volts. The negative pole of the battery is connected to the binding post G, and the positive pole is connected to one side of a 24,000 ohm current-limiting resistor $R_1$. $S_1$ is a SPST switch and $S_2$ is a 3-circuit selector switch. $R_2$ is a 500 megohm potentiometer and $C_1$, $C_2$ and $C_3$ are condensers having a capacity of 0.3, 0.5 and 0.7 mfd., respectively. The indicator consists of a 1 watt 215 volt neon glow lamp. The metal base and carbon resistor built into this lamp are removed and the lamp is mounted in a special socket. J is a closed circuit phone jack that permits the use of phones if an audible signal is desired.

The entire instrument may be enclosed in a case that can easily be carried in one hand. The neon glow tube, phone jack, binding posts G and S and the external controls $S_1$, $S_2$ and $R_2$ are mounted on one exterior surface of the case. This instrument is operated as follows: The binding post identified by the letter "G" is grounded to the conducting surface of the tank to be tested and a swab which may consist of absorbent cotton, is saturated with an electrolyte. This electrolyte may be made up of 500 parts of water, 500 parts alcohol, 10 parts of 35% hydrochloric acid and 2-5 parts of a surface active agent such as di-octyl sodium sulfosuccinate. The selector switch $S_2$ is then positioned so that $C_1$ is in parallel with the glow tube and the swab is connected by a copper wire to the binding post marked "S." The potentiometer $R_2$ is then adjusted for maximum oscillating flashes on the lamp with the swab in contact with the grounded equipment. If the glow tube flashes about 10-20 times per second under these conditions, the instrument is adjusted and functioning properly. The saturated swab is then passed over the surface to be tested.

In general, if the potentiometer is adjusted to give maximum oscillation under the conditions described above, the neon glow lamp will give a short flash about every three seconds when the swab is in contact with a sound, unbroken surface. As the swab nears a break in the coating, the short flashes will increase in frequency; this may occur as far as two feet from the surface break, but it may always be detected when the swab approaches within one foot of the surface break. The closer the swab approaches the break, the more frequently the lamp flashes, until a pulsating glow is obtained when the swab is directly on the break.

Under normal conditions, the instrument is used with $S_2$ in such position that the 0.3 mfd. condenser is in parallel with the glow tube. Provision is made, however, to increase the capacity of this condenser in order that the instrument may be used under varying atmospheric conditions. On a cool, damp day it may be found that the lamp will flash very rapidly, even though the coating itself may be perfectly sound. If $S_2$ is then changed so that a larger condenser is in the circuit, the flashing frequency of the neon bulb may be reduced so that the instrument will operate exactly the same as it does on a warm, dry day.

If an audible signal is desired by the operator, a pair of phones may be placed in series with the circuit without the addition of an amplifier stage.

The oscillator described above may be conveniently used in the dark interior of large tanks, as its frequency corresponds exactly with the flashing of the glow tube. It is sturdy, simple in construction, light in weight and mobile. It will not initiate an explosion and may be easily handled by one man. Furthermore, the operating condition of the instrument is always known, as dead batteries or any other defect would be indicated by failure of the neon tube to flash.

Figure 2:
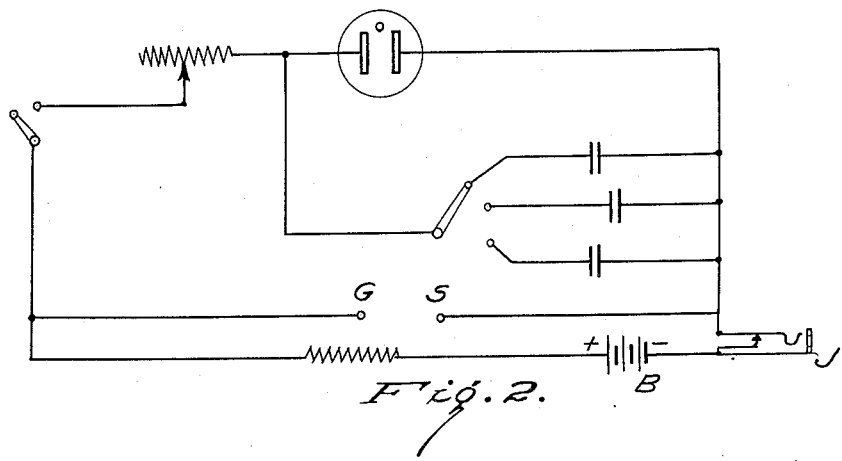
Fig. 2 illustrates a method of connecting a swab in parallel with the resistance which controls the oscillator frequency.

The relative arrangement of the circuit components of Figure 1 is flexible. For example the batteries may be isolated in a separate container. Under such circumstances, however, that portion of the battery on the high voltage side of the current limiting should be well insulated from ground to avoid all possibility of sparking. Fig. 2 illustrates a method of connecting the swab in parallel with the resistance which controls the oscillator frequency.

Figure 3:
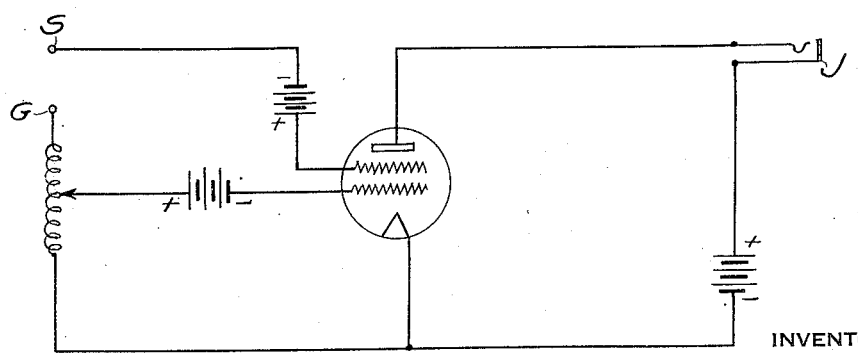
Fig. 3 illustrates a so-called negative resistance oscillator.

Any of the oscillators that are well known in the electronics art may be substituted for the relaxation oscillator of Fig. 1. Frequently, the oscillator period ($t$) is an inverse function of the resistance, but the so-called negative resistance oscillator of Fig. 3 may be readily adapted to our invention. We do not wish to limit this invention to any particular type of oscillator, as any oscillator the frequency of which is a single value function of resistance, may be employed.

The diagram of a circuit that employs a thyratron tube (such as the 884) is shown in Fig. 4. To understand the operation of this circuit, assume that the thyratron used is a type 885 which has the grid characteristics shown in Fig. 4. Using again a 90 volt "B" battery $E_b$, reference to Fig. 5 will indicate that the grid bias $E_c$ should be about 7½ volts. If the condenser C is initially uncharged and the swab "S" is grounded to "G," the voltage across the condenser will increase exponentially according to the equation $$E_c = E_b\left(1 - e^{-\frac{t}{RC}}\right)$$

where $t$ is the time in seconds, R is the resistance in megohms and C is the capacity in microfarads. This charging process which occurs in the RC circuit, will continue until the voltage across the condenser reaches approximately 60 volts, at which time the tube will break down. The charge will leak off the condenser very rapidly and the tube will stop conducting when the cathode to anode potential falls below about 16 volts, the maintaining voltage of the 885 tube. The condenser will then recharge through the RC circuit and the entire process will repeat itself. The period of oscillation will be dependent upon R, C and the voltages $E_c$ and $E_b$.

The multivibrator may be used as the oscillator of our invention acording to Fig. 6. The values of $R_3$ and $R_4$ and B should preferably be so chosen that the instrument operates within the audible range.

Our preferred detector when employing any of the circuits discussed above, is a pair of earphones. It will be recognized, however, that the natural period of the oscillator may be above the audio frequency range and still be operative for the purpose of this invention. It is only necessary to add a second beat frequency oscillator which will produce a heterodyne in the audible range. If one wishes to use a loud speaker as the pulse detector, an amplifier stage may be added.

We claim:

1. A rapid method of detecting minute breaks in the non-conducting lining of metallic chemical vessels, protected by said non-conducting lining from corrosive attack which comprises applying a low voltage source between the said metal kettle and a parallel neon glow tube condenser circuit through a variable resistance, said parallel circuit being in series with a swab saturated with a conducting electrolyte, said swab being very small in area in comparison with the total area of the said non-conducting lining being tested, and moving the said swab, while detecting the rate of flashing of the neon glow tube, over the area of said non-conducting lining, and determining the location of said breaks in said non-conducting lining before the said swab has contacted said breaks from the increase in the rate of flashing of said neon glow tube when moved over a distance many times the diameter of said swab from a plurality of directions relative to said break, thus obtaining a cross-bearing on the location of said break.

2. The method of claim 1 in which the rate of flashing of said neon glow tube is detected by visual observation.

3. The method of claim 1 in which the rate of flashing of said neon glow tube is detected by sound through a closed audio circuit in series with the swab.

References Cited in the file of this patent

UNITED STATES PATENTS

| | | |
|---|---|---|
| 1,938,684 | Bond | Dec. 12, 1933 |
| 2,031,840 | McCarty | Feb. 25, 1936 |
| 2,105,542 | Martensson | Jan. 18, 1938 |
| 2,170,487 | Soler | Aug. 22, 1939 |
| 2,376,232 | Cummings | May 15, 1945 |
| 2,379,947 | Bandur | July 10, 1945 |
| 2,504,848 | Kunz | Apr. 18, 1950 |
| 2,515,736 | Saville | July 18, 1950 |
| 2,572,597 | Connor | Oct. 23, 1951 |

FOREIGN PATENTS

| | | |
|---|---|---|
| 494,345 | Great Britain | Oct. 25, 1938 |